(12) United States Patent
Stefanoski et al.

(10) Patent No.: US 9,986,278 B2
(45) Date of Patent: May 29, 2018

(54) INTERACTIVE BROADCAST

(71) Applicant: Disney Enterprises, Inc., Burbank, CA (US)

(72) Inventors: Nikolce Stefanoski, Zürich (CH); Aljoscha Smolic, Aarau (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days. days.

(21) Appl. No.: 14/829,549

(22) Filed: Aug. 18, 2015

(65) Prior Publication Data

US 2016/0373795 A1    Dec. 22, 2016

Related U.S. Application Data

(60) Provisional application No. 62/181,130, filed on Jun. 17, 2015.

(51) Int. Cl.
*H04N 7/173* (2011.01)
*H04N 21/2668* (2011.01)
*H04N 21/235* (2011.01)
*H04N 21/239* (2011.01)
*H04N 21/258* (2011.01)
*H04N 21/81* (2011.01)
(Continued)

(52) U.S. Cl.
CPC ..... *H04N 21/2668* (2013.01); *H04N 21/2353* (2013.01); *H04N 21/2393* (2013.01); *H04N 21/25866* (2013.01); *H04N 21/44218* (2013.01); *H04N 21/816* (2013.01); *H04N 21/8173* (2013.01); *H04N 21/854* (2013.01); *H04N 21/8541* (2013.01)

(58) Field of Classification Search
CPC ........... H04N 21/2668; H04N 21/2353; H04N 21/2393; H04N 21/25866; H04N 21/44218; H04N 21/816
USPC ........................................................ 725/93
See application file for complete search history.

(56) References Cited

U.S. PATENT DOCUMENTS

2006/0064733 A1\* 3/2006 Norton ................. G11B 19/025
725/135
2008/0300053 A1\* 12/2008 Muller .................... G06F 17/24
463/31

(Continued)

OTHER PUBLICATIONS

"From Linear Story Generation to Branching Story Graphs" by Mark o. Reidl and R. Michael Young, May 1, 2006, pp. 1-6.

*Primary Examiner* — Nathan Flynn
*Assistant Examiner* — Alfonso Castro
(74) *Attorney, Agent, or Firm* — Farjami & Farjami LLP

(57) ABSTRACT

There is provided a server for providing an interactive broadcast. The server includes a memory configured to store a story manager including an event controller, a story controller and an action processor, and a hardware processor configured to execute the story manager. The story manager is configured to provide, using the event controller, an event based on a control script, story elements metadata, one or more user performance analyses, and one or more user preferences. The story manager is also configured to generate, using the story controller, an action command based on the event received from the event controller and a story state. The story manager is further configured to determine, using the action processor, an action corresponding to the action command for initiating one or more control processes for distributing the interactive broadcast.

18 Claims, 6 Drawing Sheets

(51) Int. Cl.
*H04N 21/442* (2011.01)
*H04N 21/854* (2011.01)
*H04N 21/8541* (2011.01)

(56) References Cited

U.S. PATENT DOCUMENTS

| | | | |
|---|---|---|---|
| 2010/0180297 A1* | 7/2010 | Levine | H04N 5/45 |
| | | | 725/38 |
| 2011/0093560 A1* | 4/2011 | Morris | H04L 67/02 |
| | | | 709/217 |
| 2011/0302611 A1* | 12/2011 | Eyer | H04N 21/4345 |
| | | | 725/46 |
| 2013/0094830 A1* | 4/2013 | Stone | H04N 5/775 |
| | | | 386/230 |

* cited by examiner

INTERACTIVE BROADCAST

RELATED APPLICATION(S)

The present application claims the benefit of and priority to a U.S. Provisional Patent Application Ser. No. 62/181, 130, filed Jun. 17, 2015 and titled "Interactive Television," which is hereby incorporated by reference in its entirety into the present application.

The work leading to this invention has received funding from the European Union Seventh Framework Programme (FP7/2007-2013) under grant agreement no. 611761.

BACKGROUND

Television broadcasting traditionally involves one-way transmissions of TV content, such as news, game shows and movies, which can only bring passive TV viewing experience to an audience. While significant efforts have been made in recent years, the interaction between viewers and TV content is practically limited to phone calls, Internet chats, and live video feeds, due to challenges presented during integration of user participation and engagement and the TV content. For example, in an interactive game show, interactivity elements from users may have an impact on a main story line of the game show. As such, incorporating the interactivity elements to the main story line while keeping the story logically coherent as it unfolds, is a crucial but difficult task. Thus, there is a need in the art for an advanced media access and delivery platform that encourages user's engagement with the content.

SUMMARY

The present disclosure is directed to systems and methods for providing an interactive broadcast, substantially as shown in and/or described in connection with at least one of the figures, as set forth more completely in the claims.

DETAILED DESCRIPTION

Figure 1:
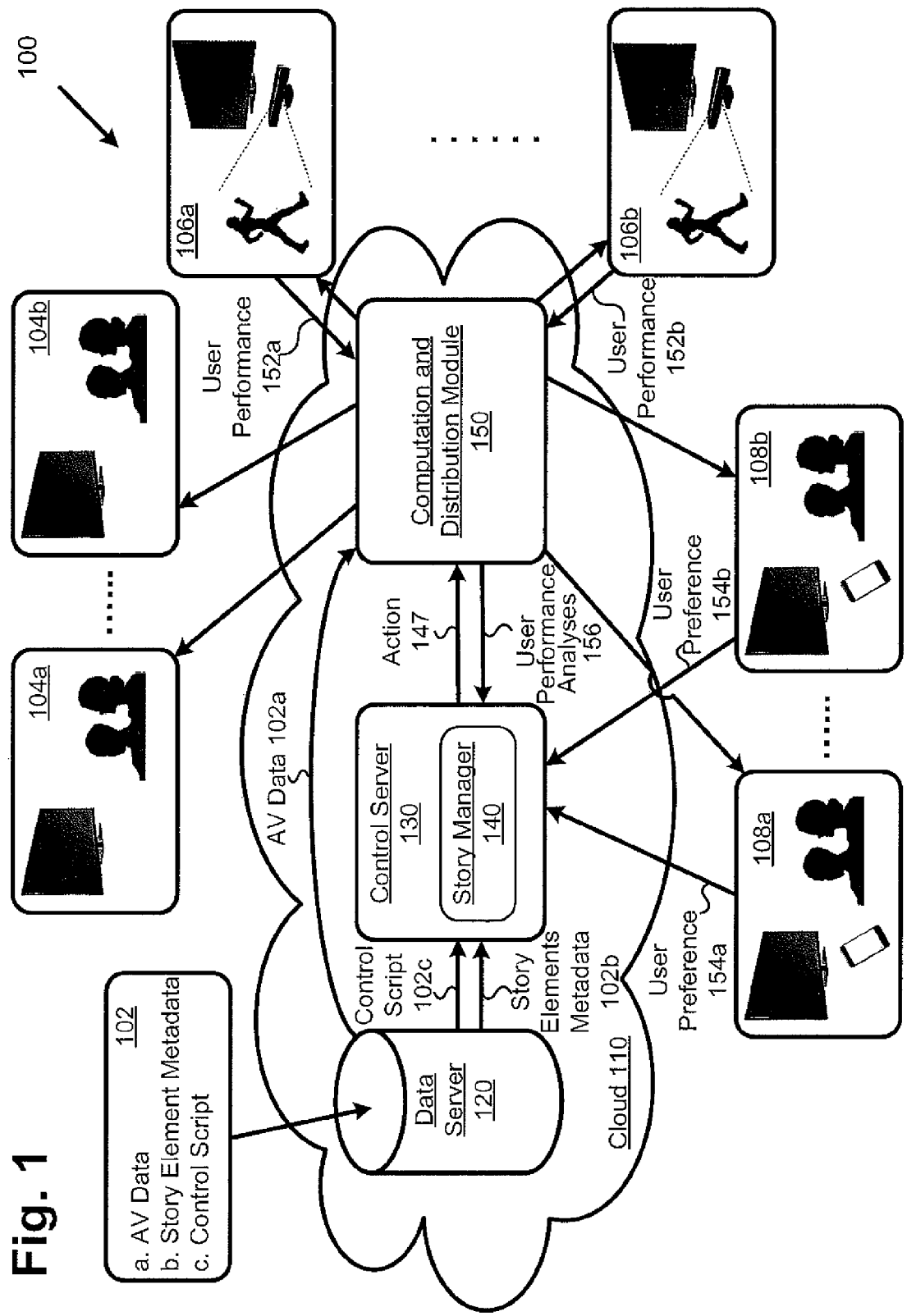
FIG. 1 shows a diagram of an exemplary system for providing an interactive broadcast, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of exemplary system 100 for providing an interactive broadcast, such as an interactive television broadcast, according to one implementation of the present disclosure. As shown in FIG. 1, system 100 includes content generator 102, non-collaborating users 104a and 104b, active collaborating users 106a and 106b, passive collaborating users 108a and 108b, cloud 110, data server 120, control server 130, and computation and distribution module 150.

As illustrated in FIG. 1, in one implementation, content generator 102 may be responsible for generating audiovisual (AV) data 102a, story elements metadata 102b, and control script 102c, and providing (e.g., uploading) AV data 102a, story elements metadata 102b and control script 102c to data server 120 in could 110. In one implementation, AV data 102a may include captured and/or edited main story element AV content and auxiliary story element AV content for alternative story lines. In one implementation, story elements metadata 102b may include data computed from captured and/or edited AV content, which can be used for rendering of active collaborating users and their seamless integration into the auxiliary story element AV content. In one implementation, control script 102c may be generated based on information from a reference scenario (e.g., a story universe by a story author) and main and auxiliary story element AV content. It may include one or more sets of instructions that indicate an association between events and actions for maintaining a narrative of the AV content, timing information, and switching conditions/actions at interaction points among the main and auxiliary story elements during a non-linear storytelling. In other words, control script 102c is responsible for unfolding a unique coherent story through concatenation of main and auxiliary story elements, while providing possibilities for user interactions which can have an impact on the story line. For example, in one implementation, control script 102c may include game logic that controls personalized and non-personalized story elements. In one implementation, story elements metadata 102b and control script 102c may be collectively referred to as metadata.

As shown in FIG. 1, system 100 also includes non-collaborating users 104a and 104b, active collaborating users 106a and 106b, and passive collaborating users 108a and 108b. Non-collaborating users 104a and 104b may include users passively viewing without having any interaction with the main story element AV content. For example, non-collaborating users 104a and 104b are in their homes watching TV. Active collaborating users 106a and 106b may include users actively engaged in an interaction with a TV program. As illustrated in FIG. 1, active collaborating users 106a and 106b are each at an active collaborating user terminal (e.g., their homes) watching TV, and actively engaged in an interaction with a TV program. In one implementation, active collaborating users 106a and 106b may compete against each other in a game show. In another implementation, active collaborating users 106a and 106b may each compete with other active collaborating users in separate game shows. As illustrated in FIG. 1, each active collaborating user terminal may be equipped with a capture setup (e.g., a multi-view capture device) for capturing performances of an active collaborating user. The capture setup may also provide 3D data based on the performances of the active collaborating user to cloud 110. The active collaborating user, as well as passive collaborating users and non-collaborating users, may receive a personalized media stream from cloud 110 showing rendering results of one or more active collaborating users integrated in the AV content.

As illustrated in FIG. 1, passive collaborating users 108a and 108b may include users who do not actively engage in an interaction with a TV program, but may respectively provide user preferences 154a and 154b, for example, to judge the performances of active collaborating users 106a and 106b and vote for active collaborating users 106a and 106b. As illustrated in FIG. 1, passive collaborating users 108a and 108b are each at a passive collaborating user terminal (e.g., their homes) receiving a personalized stream transferred from cloud 110 showing rendering results of one or more active collaborating users. Each passive collaborating user terminal may be equipped with an input device (e.g., a remote or smart phone) to input user preferences for judging the performances of one or more active collaborating users. In one implementation, passive collaborating users 108a and 108b may be members of a social group to which active collaborating users 106a and 106b belong. In one implementation, only users within the same social group as active collaborating users 106a and 106b may watch, judge, and vote for active collaborating users 106a and 106b.

As illustrated in FIG. 1, cloud 110 may be a media cloud for storing, processing, and broadcasting content from content generator 102, active collaborating users 106a and 106b, and passive collaborating users 108a and 108b. Cloud 110 may include data server 120, control server 130, and computation and distribution module 150. Data server 120 may provide AV data 102a to computation and distribution module 150, where AV data 102a can be processed based on actions provided by control server 130. Data server 120 may also provide story elements metadata 102b and control script 102c to control server 130. Control server 130 may include a processor (not explicitly shown in FIG. 1) for executing story manager 140 stored in a memory (not explicitly shown in FIG. 1). Story manager 140 may receive story elements metadata 102b and control script 102c from data server 120, and user preferences 154a and 154b from passive collaborating users 108a and 108b, respectively, and user performance analyses 156 from computation and distribution module 150 based on user performances 152a and 152b of active collaborating users 106a and 106b, respectively. Story manager 140 may provide action 147 to computation and distribution module 150 to initiate one or more control processes for distributing the interactive broadcast.

Figure 2:
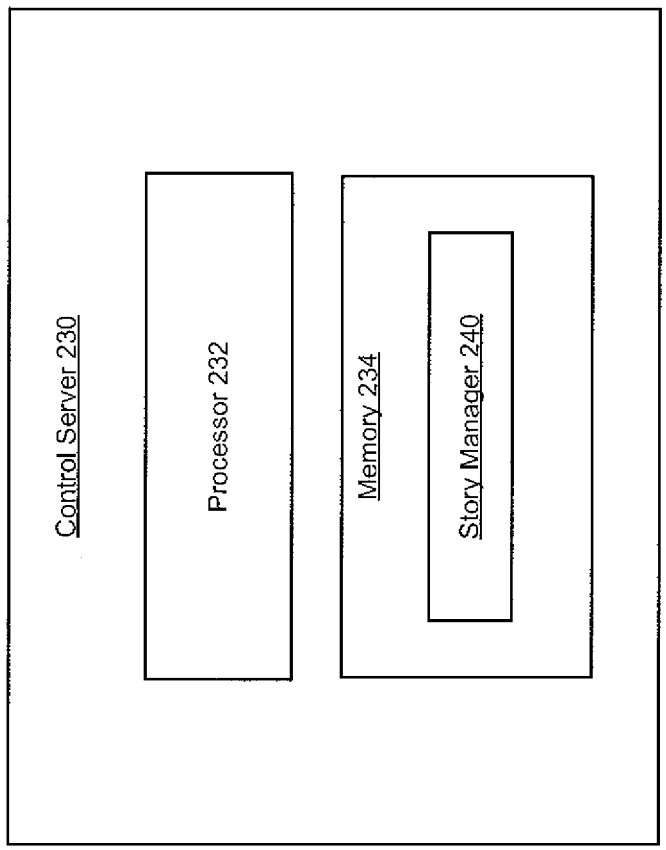
FIG. 2 shows a diagram of a portion of the exemplary system of FIG. 1 having a control server including a hardware processor and a memory, according to one implementation of the present disclosure.

FIG. 2 shows a diagram of a portion of exemplary system 100 having control server 230 including hardware processor 232 and memory 234, according to one implementation of the present disclosure. As illustrated in FIG. 2, control server 230 includes processor 232 and memory 234. Processor 232 may be a hardware processor or a central processing unit (CPU) configured to receive input, for example, from data server 120, passive collaborating users 108a and 108b, and computation and distribution module 150 in FIG. 1, and access memory 234. Memory 234 is a non-transitory medium for storing data, such as store story manager 240.

In order to provide an interactive broadcast of a story or show for allowing users to experience different story lines based on their interactoins, a main story line and all possible alternative story lines may be specified in a story universe created by a story author, such as game show writers. In one implementation, a story universe, which includes all possible story lines, may be determined by a control script and story elements registered in the control script. In a story universe, different story lines may exist in parallel, but they can also meet and cross if story states become equivalent as some point in time. A story author may extend an existing story universe with new story elements or whole story branches by producing new story elements and registering them in the control script. For example, registering a story element may require specifying at which event and story state the story element is to be played.

Figure 3:
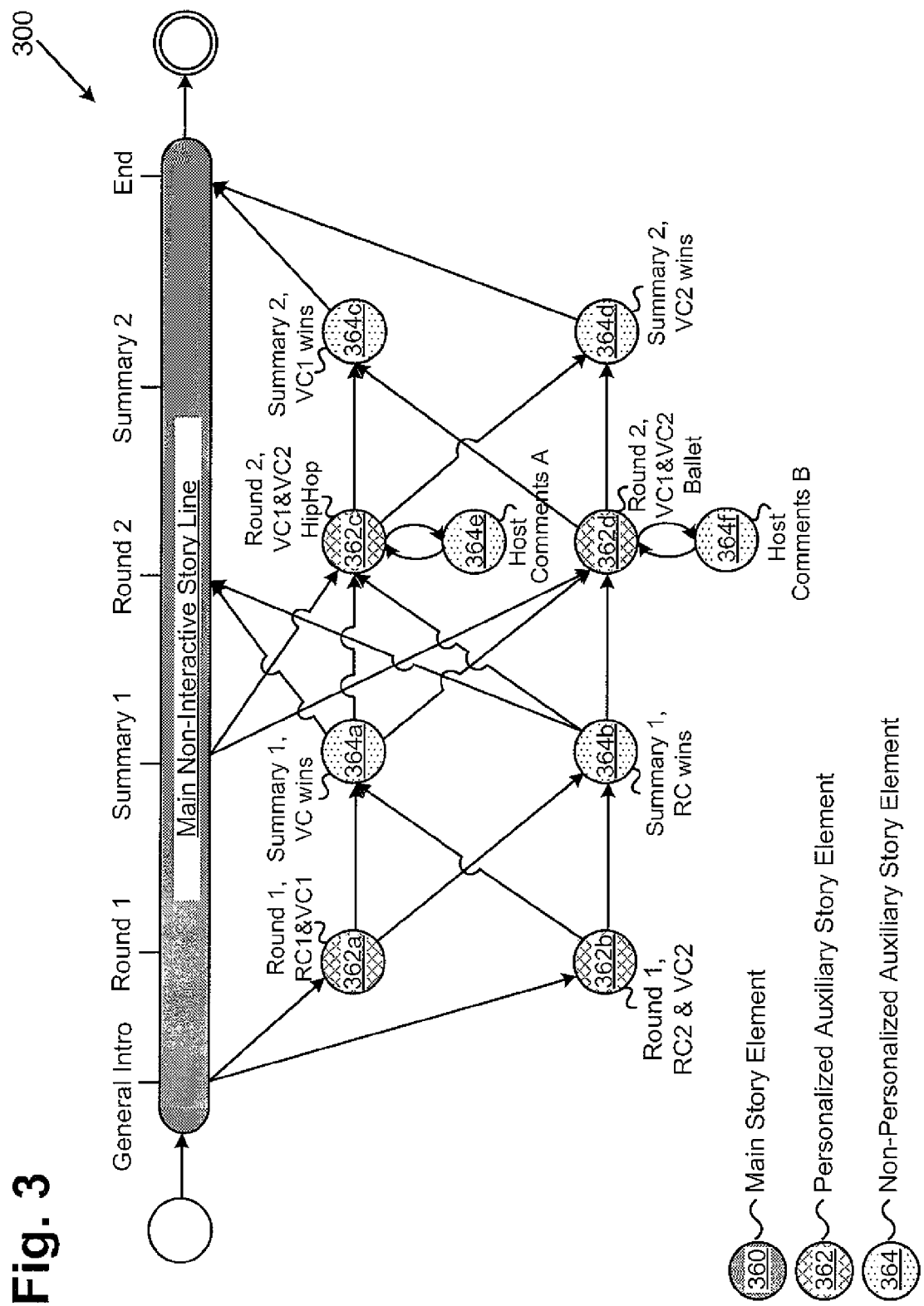
FIG. 3 shows a diagram of a branching story graph for an exemplary interactive TV show, according to one implementation of the present disclosure.

FIG. 3 shows a diagram of a branching story graph for an exemplary interactive TV show, according to one implementation of the present disclosure. In the present implementation, branching story graph 300 in FIG. 3 includes a main story line, all possible alternative story lines, and all possible story elements of an exemplary game show, Action Duel. Branching story graph 300 may be used to illustrate the causal relationships between all story elements of Action Duel. Every node in branching story graph 300 represents a story element, while arrows indicate their causal relationships. Although the exemplary game show, Action Duel, is described in the present implementation, it should be understood that an interactive broadcast described in the present application is not limited or restricted to game shows, but applicable to other genres.

As illustrated in FIG. 3, branching story graph 300 includes main story element 360, which is a main non-interactive story line. Branching story graph 300 also includes personalized auxiliary story elements 362a, 362b, 362c, and 362d, and non-personalized auxiliary story elements 364a, 364b, 364c, 364d, 364e, and 364f, which are auxiliary story elements for supporting user interactions. As mentioned above, main story element 360 may represent the main story line of Action Duel that is not meant for interaction and comparable to a traditional broadcast stream. The auxiliary story elements, such as personalized auxiliary story elements 362a-362d and non-personalized auxiliary story elements 364a-364f, may allow for user interaction and engagement. For example, personalized auxiliary story elements 362a-362d may include auxiliary story elements that are personalizable, so that users such as active collaborating users 106a and 106b in FIG. 1 can interact with Action Duel and their visual appearances can be integrated in the interactive broadcast. Non-personalized auxiliary story elements 364a-364f may include auxiliary story elements that are not personalizable, but represent content which is in context of user interactions such as host providing a summary or comments related to an interaction. The auxiliary story elements 362a-362d and 364a-364f allow the active and passive collaborating users to switch to different story branches based on their interactions with the game show. In an implementation, several viewers can simultaneously watch and participate in different auxiliary streams. All these stories can happen in parallel to the main non-interactive story line. All story lines can lead back to the main non-interactive story line. Table 1 describes the plot of all story elements of the game show, Action Duel.

TABLE 1

| Story Element Name | Description |
|---|---|
| Main | The main story element representing a non-interactive quiz show with two real candidates (RC1 and RC2) located in a studio. The quiz show has 6 |

TABLE 1-continued

| Story Element Name | Description |
| --- | --- |
| Round 1, RC1 | A knowledge duel between a virtual candidate (VC) and RC1. The virtual candidate is visually integrated in the scene and answers questions. |
| Round 1, RC2 | A knowledge duel between one virtual candidate (VC) and RC2. The virtual candidate is visually integrated in the scene and answers questions. |
| Summary1, VC wins | The host summarized the results and mentions that the VC wins. |
| Summary1, RC wins | The host summarized the results and mentions that the RC wins. |
| Round 2, HipHop | A dance duel between two virtual candidates called VC1 and VC2. The dance style is hip hop. Both VCs are visually integrated in the scene and a choreographer is also on stage. Social groups may vote for their favourite dancer. |
| Round 2, Ballet | A dance duel between two virtual candidates called VC1 and VC2. A choreographer is also on stage. The dance style is Ballet. Both VCs are visually integrated in the scene and a choreographer is also on stage. Social groups may vote for their favourite dancer. |
| Host Comments A or B | The host encourages the virtual candidates to dance. |
| Summary2, VC1 wins | The host summarized the results and mentions that the VC1 wins. |
| Summary2, VC2 wins | The host summarized the results and mentions that the VC2 wins. |

In the present implementation of the game show, Action Duel, a host, a first real candidate (RC1) and a real second candidate (RC2) may be physically located in a studio, while a first virtual candidate (VC1) and a second virtual candidate (VC2), such as active collaborating users 106a and 106b in FIG. 1, may participate during the game show from their homes by virtually entering the game show. VC1 and VC2 may be able to interact (e.g., play games in the game show), and through their participations change the story lines. Members of each of VC1 and VC2's social groups, such as passive collaborating users 108a and 108b in FIG. 1, may be able to watch and judge VC1 and VC2's performances on television.

While branching story graph 300 in FIG. 3 indicates all possible story lines, it does not describe when a transition should happen and which story element should follow if more than one possibility exists for continuing the story, e.g. depending on the performance of RC1 and VC during "Round1, RC1", the story may continue with the story element "Summary1, VC wins" or "Summary1, RC1 wins." In order to complement the information provided in FIG. 3, a story manager may be utilized to enable a continuation of the story which is authentic to the authored story but also authentic to eventual interactions and preferences of the active and passive collaborating users.

Figure 4:
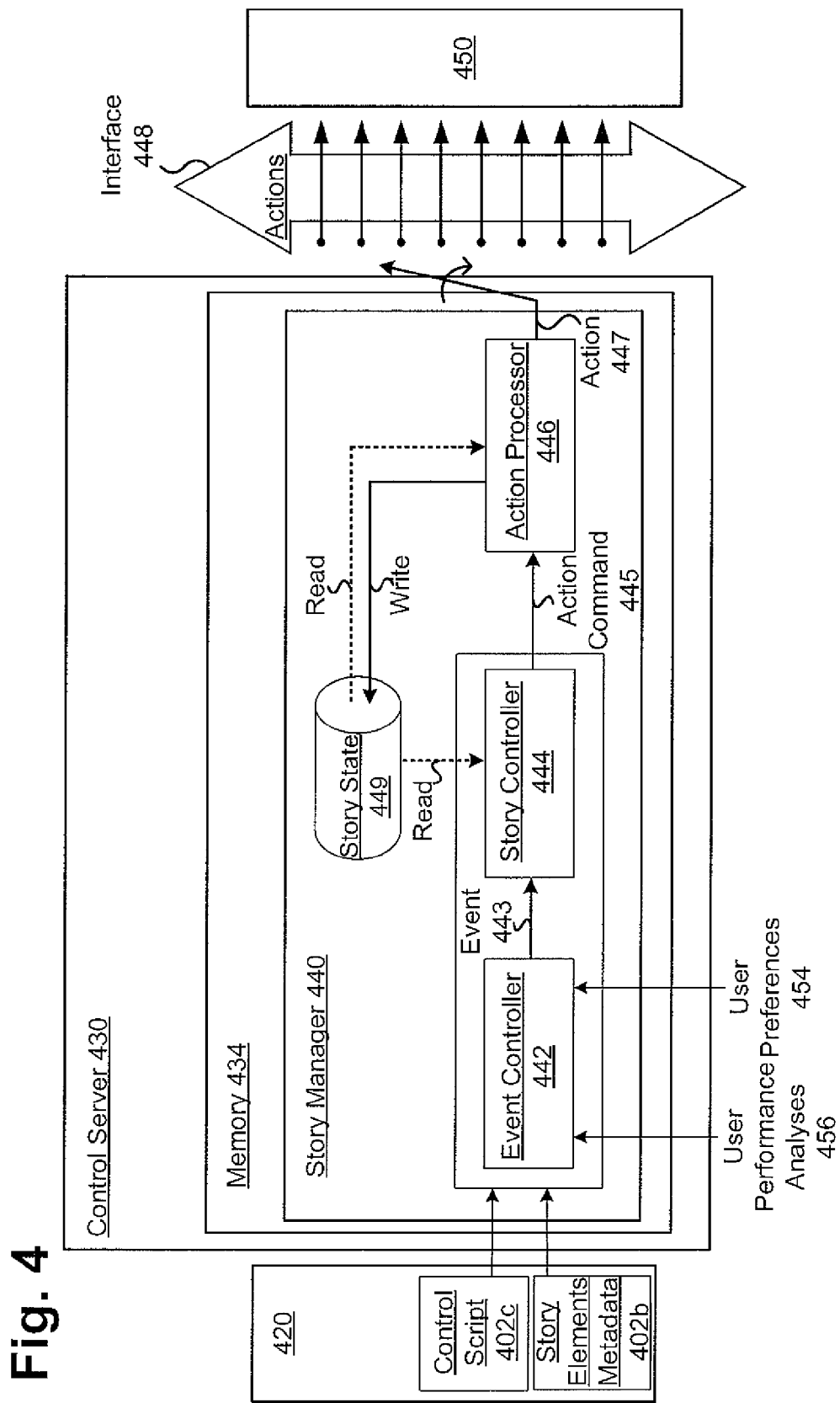
FIG. 4 shows a diagram of a portion of an exemplary system for providing an interactive broadcast having a story manager stored in a memory of a control server, according to one implementation of the present disclosure.

FIG. 4 shows a diagram of a portion of an exemplary system for providing an interactive broadcast having a story manager stored in a memory of a control server, according to one implementation of the present disclosure. As illustrated in FIG. 4, data server 420 may also provide story elements metadata 402b and control script 402c to control server 430. Control server 430 may include a processor (not explicitly shown in FIG. 1) for executing story manager 440 stored in memory 434. Story manager 440 may receive story elements metadata 402b and control script 402c from data server 420, user preferences 454 from one or more passive collaborating users (e.g., respetive user preferences 154a and 154b of passive collaborating users 108a and 108b in FIG. 1), and user performance analyses 456, for example, from computation and distribution module 450 based on user performances of one or more active collaborating users (e.g., respetive user performances 152a and 152b of active collaborating users 106a and 106b in FIG. 1). Story manager 440 may provide action 447 to computation and distribution module 450, through interface 448 to initiate one or more control processes in computation and distribution module 450 for distributing an interactive broadcast.

As illustrated in FIG. 4, story elements metadata 402b and control script 402c are provided from data server 420 to control server 430. Control script 402c and story elements metadata 402b may be generated and provided by a content generator based on a reference scenario (e.g., a story universe by a story author) and main and auxiliary story element AV content. Control script 402c may be used determine a story universe and include a registry of one or more sets of story elements. Story elements metadata 402b may include a description of the story universe, a description of interactions, and rendering parameters. In one implementation, control script 402c may specify all events defined as being dependent upon a main non-interactive story element (e.g., main story element 360 in FIG. 3) and one or more auxiliary interactive story elements (e.g., personalized auxiliary story elements 362 and non-personalized auxiliary story elements 364 in FIG. 3). Control script 402c is responsible for keeping a story logically coherent, which is told through a concatenation of the story elements, and to keep the story faithful to user interactions and engagement. For example, control script 402c controls at which point in time a switch to some other story element may happen and which story element this will be, and enables/disables user interactions or engagement. As such, control script 402c and story elements metadata 402b based on story elements are generated, and story manager 440 is used to interpret control script 402c to orchestrate computation and distribution module 450 in such a way that the users can interact and engage with one or more non-linear stories intended by the story author.

As illustrated in FIG. 4, story manager 440 includes event controller 442, story controller 444, action processor 446, and story state 449. Each of event controller 442 and story controller 444 may be initialized with information provided by control script 402c and story elements metadata 402b. Event controller 442 may provide event 443 to story controller 444. Story controller 444 may receive event 443 and story state 449, and emit action command 445 to action processor 446. Corresponding action 447 may be executed by action processor 446 which initiates certain control processes related to computation and distribution module 450 (e.g. "start a story element" and "start mixing").

In one implementation, event controller 442 may generate events at certain points in time or bypass events to its output which are received from user performance analyses 456 and user preferences 454. Event 443 may indicate a notable occurrence at a particular point in time (e.g., "start of round1", "button pressed by a home user", or "home user is not dancing"). Event controller 442 can distinguish events based on their type, which can be trigger or listen. Events which are specified as part of an authored story are triggered events (i.e., their time of occurrence is known a-priory and they are triggered correspondingly), while events received from users (e.g., "button pressed by a home user") or an analysis system (e.g., "home user is not dancing") from an analysis system of computation and distribution module 450 are listened events (e.g., their time of occurrence is known during runtime). As such, event controller 442 may either trigger events or listen to events at its input and bypasses them to its output if they are not in conflict with the coherence of the story intended by the story author.

In one implementation, all events may be represented in control script 402c and story elements metadata 402b in XML syntax, such as:

```
<event eid="event id" type="trigger" frame="frame number"/>
or
<event eid="event id" type="listen" frame_start="start frame number" frame_end="end frame number" payload=""/>
``` where eid is an event identifier and type is the event type and has the value "trigger" or "listen." In case the event type is "listen," an attribute frame exists which indicates the time of occurrence of the event in terms of a frame number. If the event type is "trigger", the attributes frame_start and frame_end exist, which indicate the time interval for listening to the event with the specified eid, and an empty payload attribute is specified, which indicates that a received event may have a payload, for example, to indicate a pressed button.

As illustrated in FIG. 4, event 443 is received by story controller 444, which also receives story state 449 and emits action command 445 to action processor 446. Story controller 444 knows the currently received event and the current story state, which is used to reason which action to trigger in order to enable a coherent personalized continuation of the story. In one implementation, story state 449 may define an active story element (e.g., a story element which represents the current plot), a world state, a user performance, and a user preference. In one implementation, control script 402c and story elements metadata 402b specify <is_event> elements, which trigger action command 445 based on event 443 and story state 449, and may be represented by:

```
<is_event eid="event id" seid_set="a set of story element ids">
    [One or more actions which may be emitted in dependence of
    logical conditions which depend on the world state, user
    performance, and user preference]
</is_event>.
```

Action commands, which are conditionally specified in the body of the <is_event/> element, are emitted if the current event corresponds to eid, the identifier of the current story element is in the set seid_set, and the logical conditions which are specified in the body and may depend on world state, user performance, and user preference are true.

Action command 445 may represent all action commands emitted by story controller 444. Action 447 may represent all actions corresponding to action commands represented by action command 445. Action 447 may be associated to specific processes of computation and distribution module 450. Action Processor 446 may implement functions which handle action command 445 emitted by story controller 444.

An overview of all possible actions necessary in the scope of the game show, Action Duel, is shown in Table 2. For example, Table 2 describes all possible actions that can be emitted from action processor 446 of story manager 440 for the game show, Action Duel.

TABLE 2

| Action Name | Description | Side Effect to Story State |
| --- | --- | --- |
| <action_start_element/> | Starts playing a specified story element from the beginning. | The active story element changes. |
| <action_continue_element/> | Starts playing a story element form the current frame number. | The active story element changes. |
| <action_start_playing_pip/> | Starts playing an additional story element in picture-in-picture mode. | — |
| <action_start_mixing/> | Starts integrating the visual appearance of the home user within the story element. | — |
| <action_stop_mixing/> | Stops integrating the visual appearance of the home user within the story element. | — |
| <action_select_vc/> | Selects a first VC from the pool of registered VCs. | The user performance and user preference of VC is initialized. |
| <action_select_second_vc/> | Selects a second VC from the pool of registered VCs. | The user performance and user preference of VC2 is initialized. |
| <action_rename_vcs_in_db/> | — | Renames the identifiers for the first and second VC in the user performance and user preference information to VC1 and VC2, respectively. |
| <action_show_question/> | Shows a specific question. | — |
| <action_show_scores/> | Shows the current scores. | — |
| <action_show_votes/> | Shows the current voting results. | — |
| <action_stop_show_votes/> | Hides the current voting results. | — |
| <action_update_scores/> | — | Updates the current scores in the user performance information. |
| <action_update_votes/> | — | Updates the current voting results in the user performance information. |

As described in Table 2, the first five actions represent generic (e.g., story independent) actions, which are available to any story, while the reaming actions are story specific actions. Also, the story state (e.g., story state 449) may change as a result of the actions (e.g., action 447) responsive to the action commands (e.g. action command 445), which can have an impact on the continuation of the story. As a result, the action commands (e.g., action command 445) are configured to concatenate two of the story elements, for example, shown in FIG. 3. Thus, story manager 440 enables an interactive broadcasting system to dynamically unfold a unique story based on user interactions or preferences.

As discussed above, story elements metadata 402b and control script 402c may be used to initialize event controller 442 and story controller 444. In one implementation, control script 402c may have a structure:

```
<control_script>
    <story>
        <elements_collection>...</elements_collection>
        <events_controller>...</events_controller>
        <story_controller>...</story_controller>
    </story/>
<control_script/>.
```

In the body of the <elements_collection> element, unique identifiers and file references to all metadata files of story elements which are part of the story are provided. The <events_controller> and <story controller> element contain one or more elements of type <event> and <is_event>, respectively, as they are specified above. The <events_controller> element specifies all events (e.g., event 443) which can be defined in dependence of the plot of the main story element, while the <story_controller> specifies all corresponding <is_event> elements.

All other events (and corresponding <is_event> elements), which are specific to the plot of auxiliary story elements, may be specified in separate metadata files for each story element. All these files are referenced in the body of the <elements_collection> element of the control script (e.g., control script 402c). Each story element related metadata file may have a structure:

```
<story_element>
    <story>
        <segments_collection>...</segments_collection>
        <events_controller>...</events_controller>
        <story_controller>...</story_controller>
    </story/>
<story_element/>.
```

Similar to the control script (e.g., control script 402c), the <events_controller> and <story_controller> element contain one or more elements of type <event> and <is_event>, respectively. However, in contrast to the control script, all events and corresponding <is_event> elements are related to the plot of the given story element. The <segments_collection> element contains unique identifiers and file references to metadata files which describe all media files necessary for actions of type:

```
<action_start_element/>
<action_continue_element/>
<action_start_playing_pip/>
<action_start_mixing/> and
<action_stop_mixing/>.
```

These media metadata files can not only provide filenames to AV files, but also describe rendering parameters if the action <action_start_mixing/> is active during a certain time interval of an AV file. Rendering parameters describe camera parameters and depth maps for each frame, and parameters like the interaction space, i.e. the space where a virtual character may stay, the initial location where a virtual character is integrated and its initial pose for each user. The first media file in the segments collection is automatically played if an action <action_start_element/> or <action_continue_element/> starts the story element.

After event controller 442 and story controller 444 are initialized with control script 402c and story elements metadata 402b, and a global frame counter variable is initialized with zero. Depending on the value of the frame counter, event controller 442 may generate an event, or independent on the frame counter it may receive an event and bypass it to its output. All events (e.g., event 443) are specified in the body of an <events_collection> element of control script 402c and story elements metadata 402b, which were used for initialization. Events defined in control script 402c are always emitted if the frame counter reaches the corresponding frame number, while events specified in story elements metadata 402b are emitted only if the story element is also active according to story state 449. For example, story controller 444 receives event 443 and initiates corresponding action command 445 in dependence of the event identifier and story state 449 according to the attributes specified in the <is_event> elements. <is_event> elements, which are defined in control script 402c, are always active to handle events, while <is_event> elements defined in story elements metadata 402b are only active if the story element is active according to story state 449.

After initialization and the start of the frame counter, a story is started. Based on the generated events and events received from user preferences and user performance analyses, various story elements AV content are played, transitions to other story elements happen, interactions are enabled and disabled and the story state is changed, which contributes to the realization of a unique coherent story. The overall story ends together with the end of the main story line, for example, when the global frame counter corresponds to the number of frames of the main story element minus one.

In an implementation, story controller 444, action processor 446 and story state 449 of story manager 440 may operate substantially similar in terms of functionality to a finite state machine. This means that the same functionality achievable by a finite state machine, which would require both direct low level read and write access to the story state from within the story controller, is also achievable by allowing only read access to story state 449 from within story controller 444, while shifting the write access to story state 449 to actions processor 446. Hence, an abstraction layer based on actions also hides low level story states updates from the story authoring process without conceptually restricting the story author in terms of complexity of story which he/she could tell. Thus, among other advantages, interface 448 defined by a plurality of actions, such as action 447, provided from action processor 446 enables a decoupling between AV content (e.g., AV data 102a in FIG. 1), control script 402c and story elements metadata 402b generated by a content generator (e.g., content generator 102 in FIG. 1) and computation and distribution module 450, Interface 448 also enables an easy extendibility of an existing story with new story branches and experiences, and allows a cost efficient content production.

Figure 5:
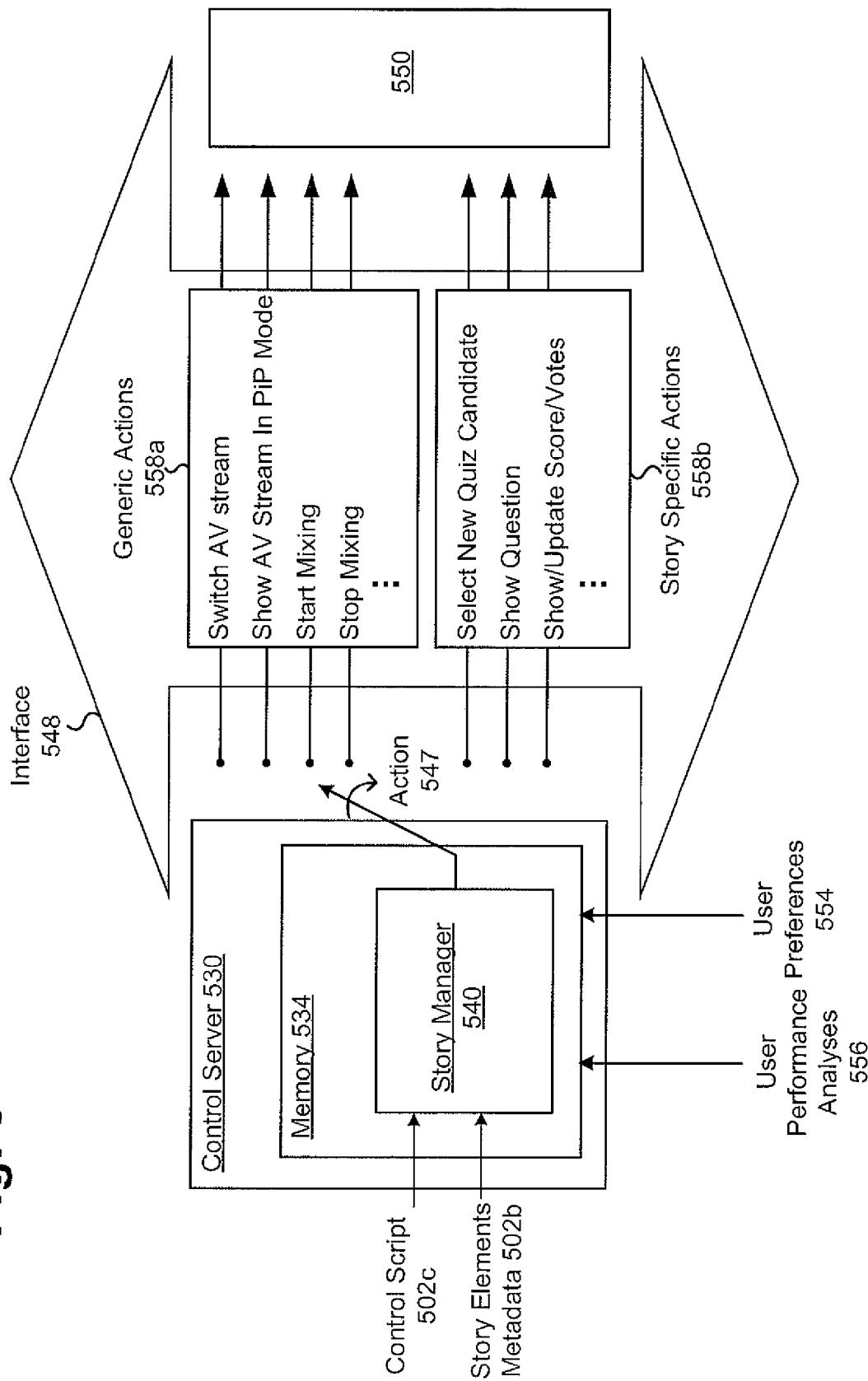
FIG. 5 shows a diagram of a portion of an exemplary system for providing an interactive broadcast having an interface between a story manager and a computation and distribution module, according to one implementation of the present disclosure.

FIG. 5 shows a diagram of a portion of an exemplary system for providing an interactive broadcast having an interface between a story manager and a computation and distribution module, according to one implementation of the present disclosure. With similar numerals designating similar features as in FIG. 4, FIG. 5 includes control server 530 having story manager 540 stored in memory 534, interface 548, and computation and distribution module 550. Story manager 540 may receive story elements metadata 502b and control script 502c, user preferences 554 from one or more passive collaborating users, and user performance analyses 556, for example, from computation and distribution module 550 based on user performances of one or more active collaborating users, and provide action 547 to interface 548.

It is noted that, since control script 502c may be program specific, interface 548 based on actions may interconnect control server 530 and computation and distribution module 550, to allow computation and distribution module 550 to become capable of distribution content from control server 430 by running a simple control script interpreter, for example. As illustrated in FIG. 5, interface 548 contains generic actions 558a and story specific actions 558b for interpreting action 547 from story manager 540 in any programming language, and provides a corresponding action to computation and distribution module 550 to initiate one or more control processes for distributing an interactive broadcast. Hence, through an interface based on actions (e.g., interface 558a), a story author is not required to deal with low level technical details of the distribution architecture and updating the story state, but he/she can concentrate on the creative process of content production, which at the same time has a positive impact on the production cost.

Figure 6:
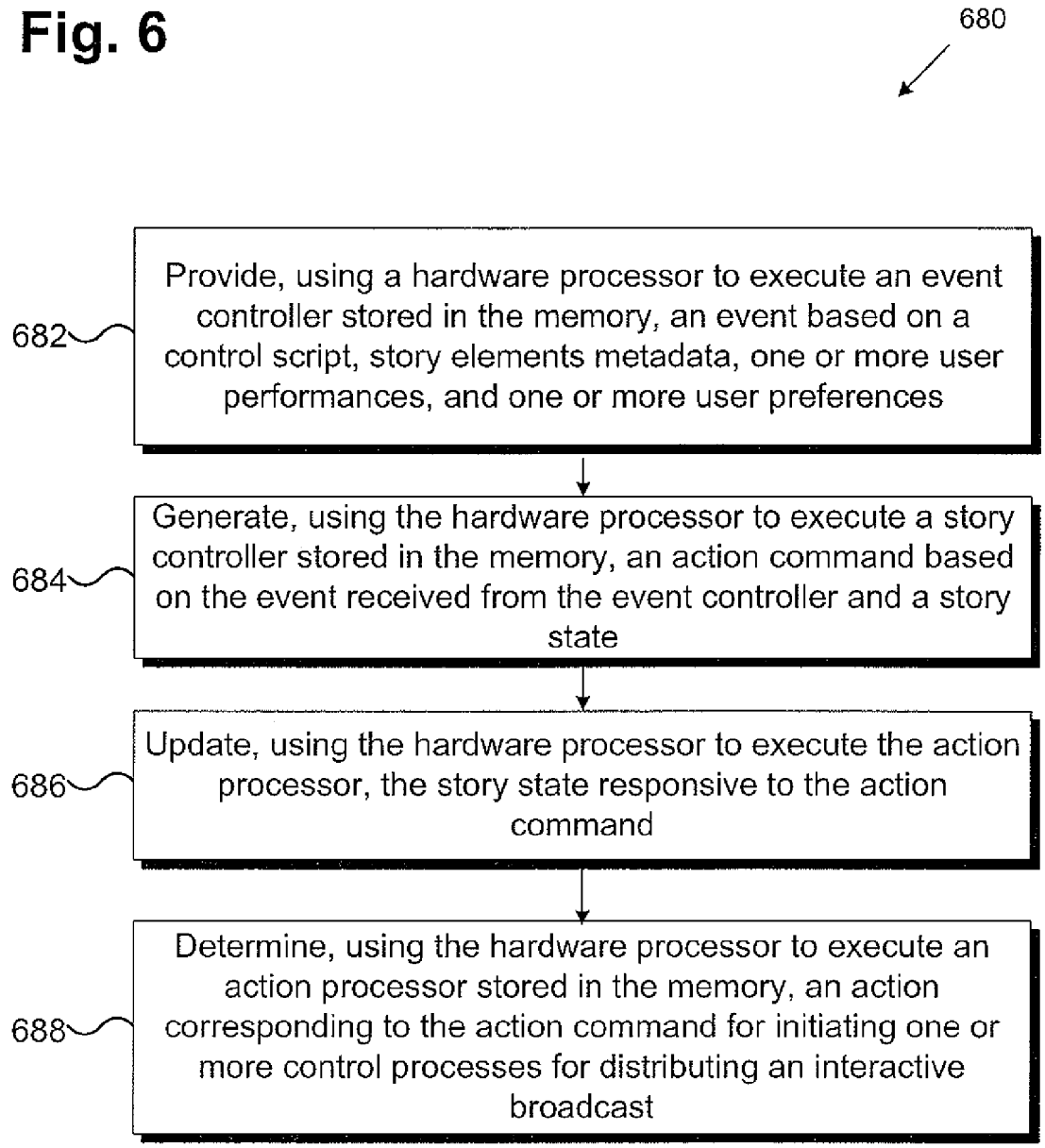
FIG. 6 shows a flowchart illustrating an exemplary method of providing an interactive broadcast, according to one implementation of the present disclosure.

FIG. 6 shows a flowchart illustrating an exemplary method of providing an interactive broadcast, according to one implementation of the present disclosure. In FIG. 6, actions 682, 684, 686, and 688 of flowchart 680 illustrate a method for use by a server having a hardware processor and a memory to provide an interactive broadcast. As illustrated in FIG. 6, action 682 includes providing, using a hardware processor to execute an event controller stored in the memory, an event based on a control script, story elements metadata, one or more user performance analyses, and one or more user preferences. Action 684 includes generating, using the hardware processor to execute a story controller stored in the memory, an action command based on the event received from the event controller and a story state. Action 686 includes updating, using the hardware processor to execute the action processor, the story state responsive to the action command. Action 688 includes determining, using the hardware processor to execute an action processor stored in the memory, an action corresponding to the action command for initiating one or more control processes for distributing an interactive broadcast.

With reference to FIG. 4, in action 682, after event controller 442 and story controller 444 are initialized with control script 402c and story elements metadata 402b, event controller 442 provides event 443 based on control script 402c and story elements metadata 402b, one or more user performance analyses 456, and one or more user preferences 454. In action 684, story controller 444 generates action command 445 based on event 443 received from story controller 444 and story state 449. In action 686, action processor 446 receives action command 445 from story controller 444, and updates story state 449 responsive to action command 445. In action 688, action processor 446 determines action 447 corresponding to action command 445 for initiating one or more control processes for distributing an interactive broadcast.

From the above description, it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A server for providing an interactive broadcast, the server comprising:
a memory configured to store a story manager including an event controller, a frame counter, a story controller, and an action processor; and
a hardware processor configured to execute the story manager to:
provide, using the event controller, an event based on a value of the frame counter, a control script, story elements metadata, one or more user preferences received from a first user, and one or more performance analyses of actions performed by a second user participating in a story, wherein the control script is for keeping the story logically coherent;
generate, using the story controller, an action command based on the event received from the event controller and a story state; and
determine, using the action processor, an action corresponding to the action command for initiating one or more control processes for distributing the interactive broadcast, wherein the action command enables a coherent personalized continuation of the story for the first user and the second user;
wherein the story elements metadata includes rendering parameters having a plurality of camera parameters for each frame including an interaction space.

2. The server of claim 1, wherein the hardware processor is configured to execute the action processor to update the story state responsive to the action command.

3. The server of claim 1, wherein the control script is configured to control a distribution module to allow user interactions with a story selected by a story author.

4. The server of claim 1, wherein the control script specifies all events defined as being dependent upon a main non-interactive story element and one or more auxiliary interactive story elements.

5. The server of claim 1, wherein the control script is used to determine a story universe and includes a registry of a plurality sets of story elements.

6. The server of claim 1, wherein the story elements metadata further includes a description of a story universe, a description of interactions, and wherein the interaction space comprises a space for a virtual character to stay, a location corresponding to the virtual character's initial location, and a pose corresponding to the virtual character's initial pose.

7. The server of claim 1, wherein the story state defines an active story element.

8. The server of claim 1, wherein the action command is configured to concatenate two of a plurality sets of story elements.

9. A method for use by a server having a hardware processor and a memory to provide an interactive broadcast, the method comprising:
providing, using the hardware processor to execute an event controller stored in the memory, an event based on a value of the frame counter, a control script, story elements metadata, one or more user preferences received from a first user, and one or more performance analyses of actions performed by a second user participating in a story, wherein the control script is for keeping the story logically coherent;
generating, using the hardware processor to execute a story controller stored in the memory, an action command based on the event received from the event controller and a story state; and
determining, using the hardware processor to execute an action processor stored in the memory, an action corresponding to the action command for initiating one or more control processes for distributing the interactive broadcast, wherein the action command enables a coherent personalized continuation of the story for the first user and the second user;
wherein the story elements metadata includes rendering parameters having a plurality of camera parameters for each frame including an interaction space.

10. The method of claim 9, wherein the event controller, the story controller, and action processor are part of a story manager stored in the memory.

11. The method of claim 10, wherein the story manager is configured to dynamically unfold a unique story based on user interactions.

12. The method of claim 9, further comprising updating, using the hardware processor to execute the action processor, the story state responsive to the action command.

13. The method of claim 9, wherein the control script specifies all events defined as being dependent upon a main non-interactive story element and one or more auxiliary interactive story elements.

14. The method of claim 9, wherein the control script is used to determine a story universe and includes a registry of a plurality sets of story elements.

15. The method of claim 9, wherein the story elements metadata includes a description of a story universe, a description of interactions, and wherein the interaction space comprises a space for a virtual character to stay, a location corresponding to the virtual character's initial location, and a pose corresponding to the virtual character's initial pose.

16. The method of claim 9, wherein the story state defines an active story element.

17. The method of claim 9, wherein the action command is configured to concatenate two of a plurality sets of story elements.

18. The method of claim 9, wherein an interface defined by a plurality of actions provided from the action processor enables a decoupling between audio-video content, the control script and the story elements metadata from a content generator and a distribution module.

* * * * *